July 19, 1966   W. H. HUNTER ET AL   3,261,286
ARTICLE HANDLING MACHINE
Filed April 21, 1964   8 Sheets-Sheet 1
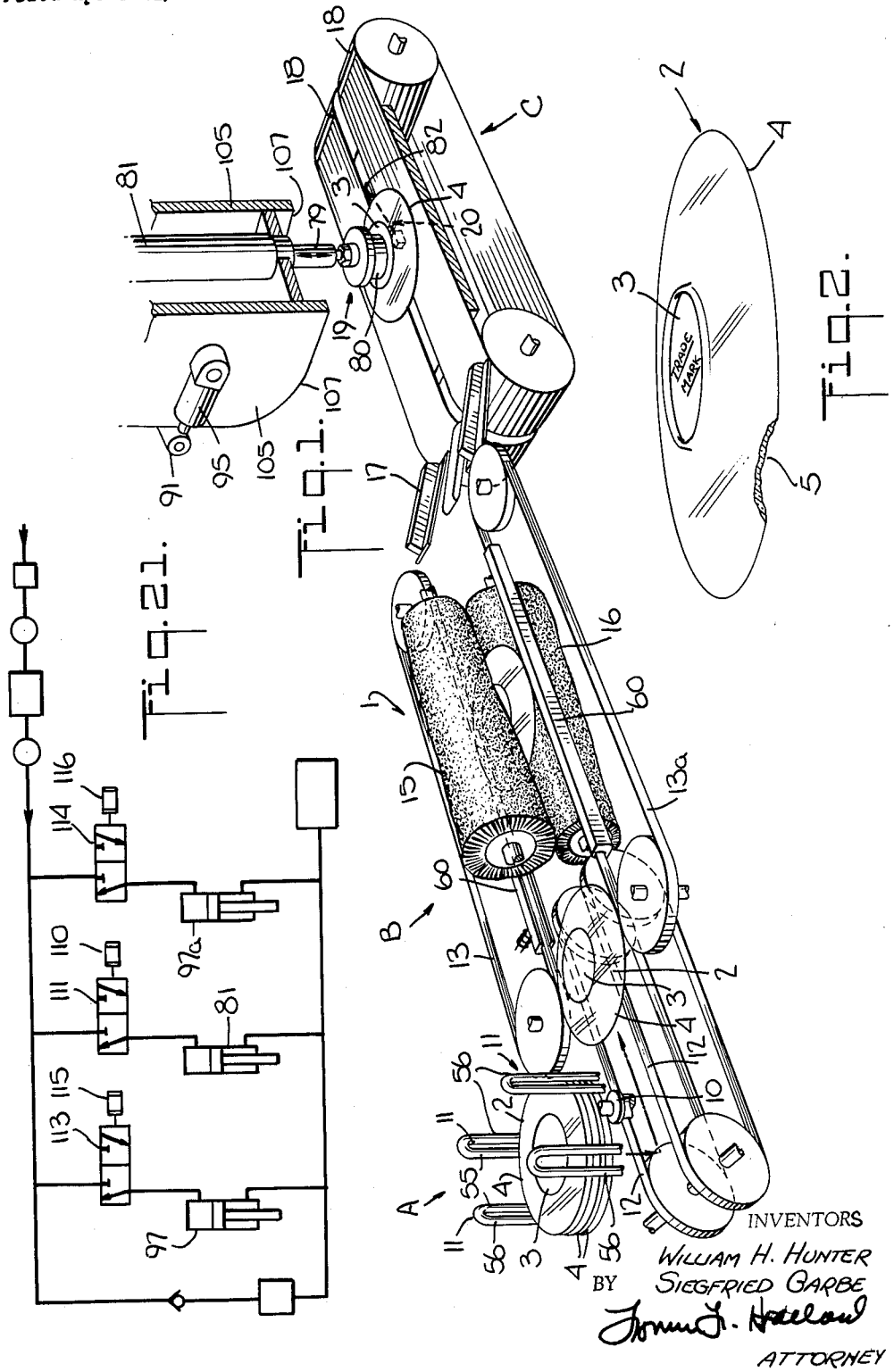
INVENTORS
WILLIAM H. HUNTER
SIEGFRIED GARBE
BY
ATTORNEY

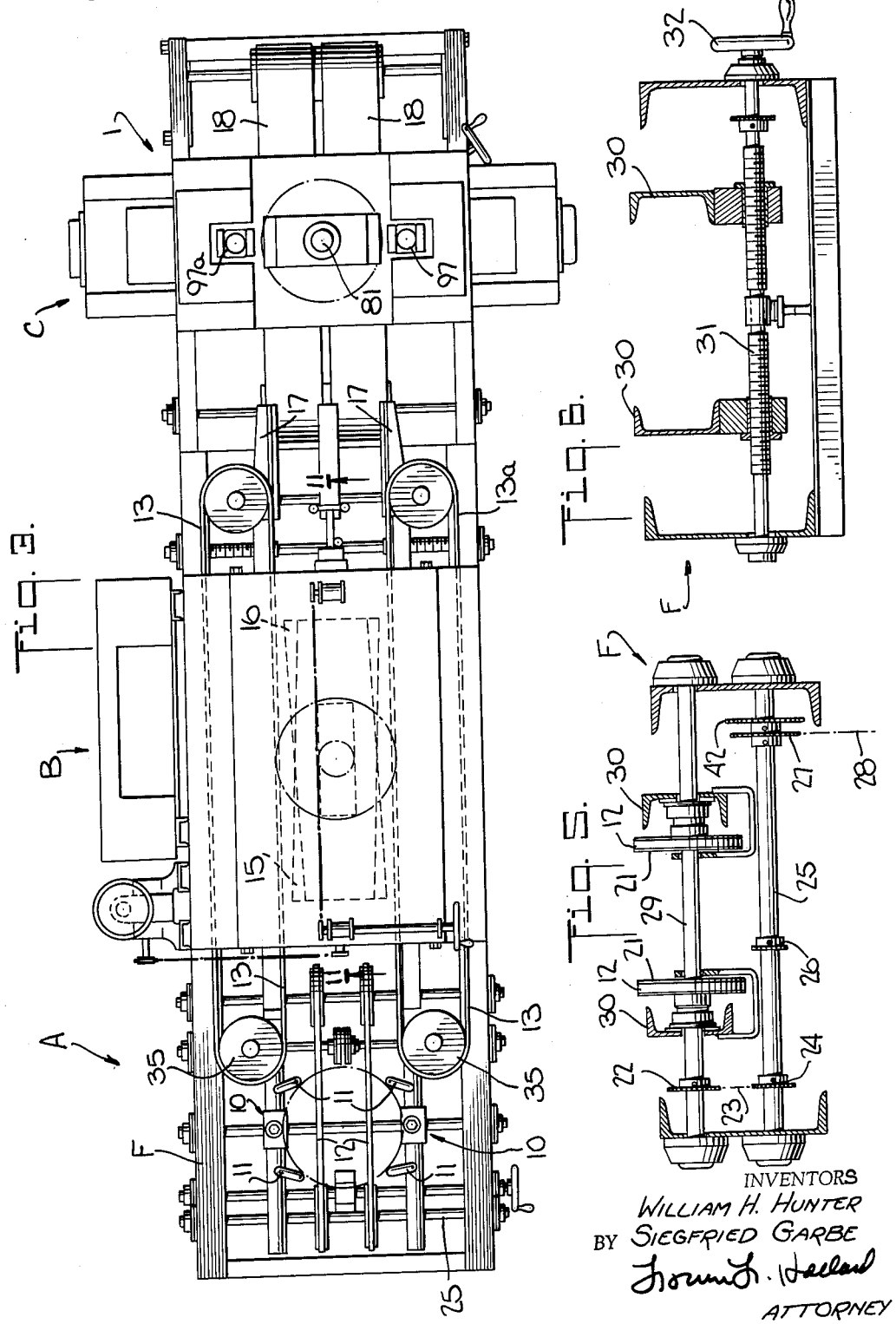

July 19, 1966  W. H. HUNTER ET AL  3,261,286
ARTICLE HANDLING MACHINE
Filed April 21, 1964  8 Sheets-Sheet 3
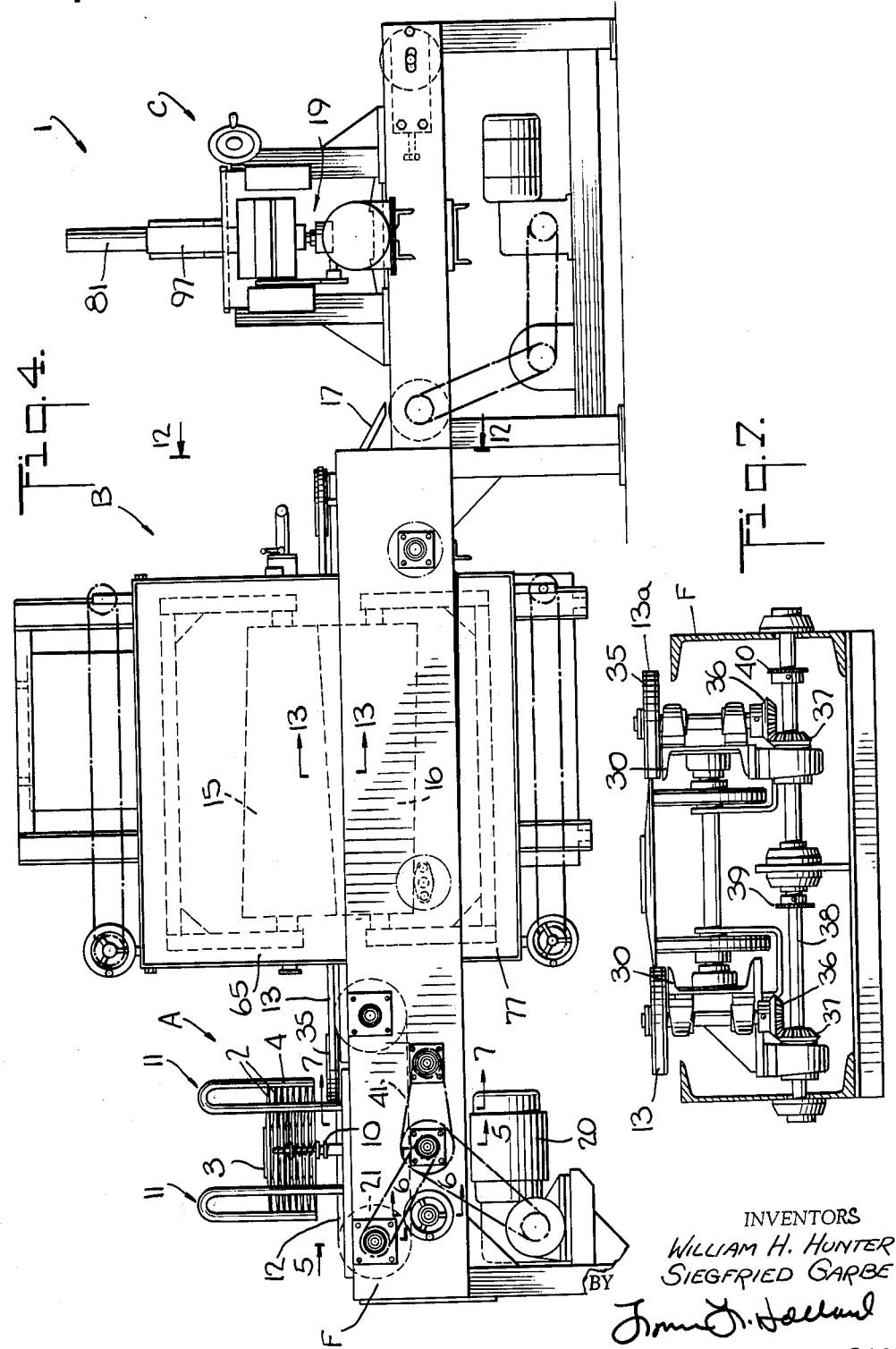
INVENTORS
WILLIAM H. HUNTER
SIEGFRIED GARBE
BY
ATTORNEY

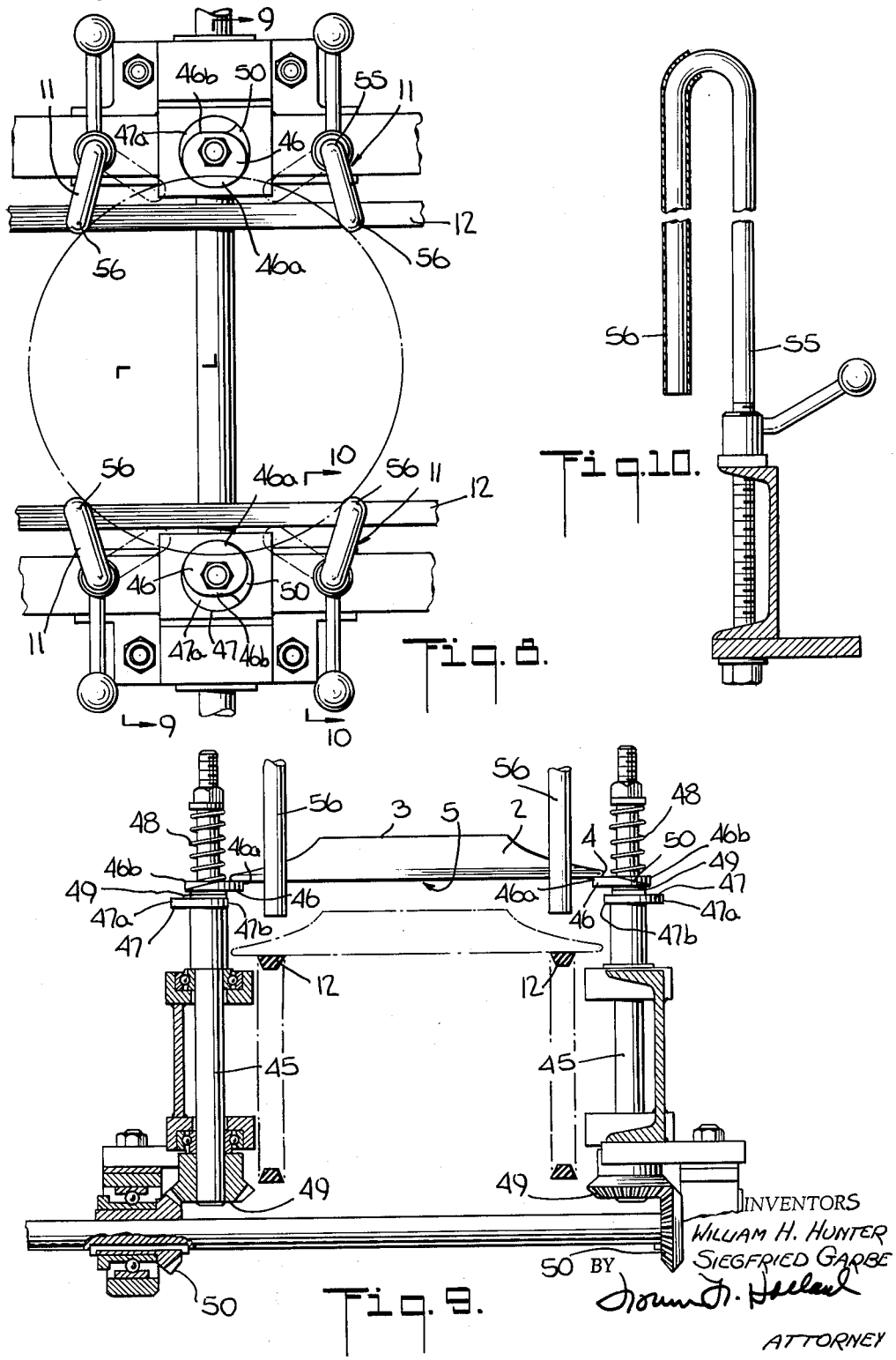

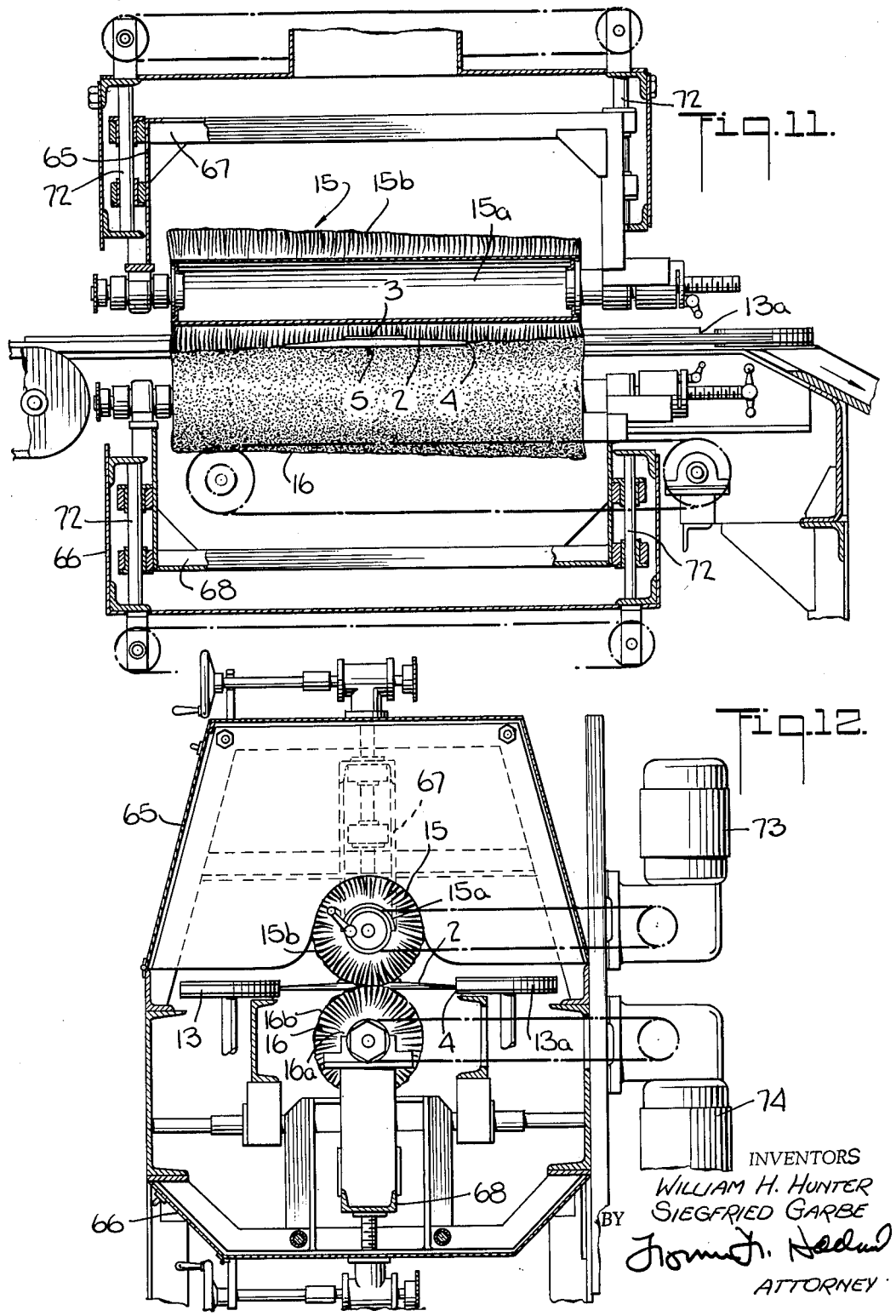

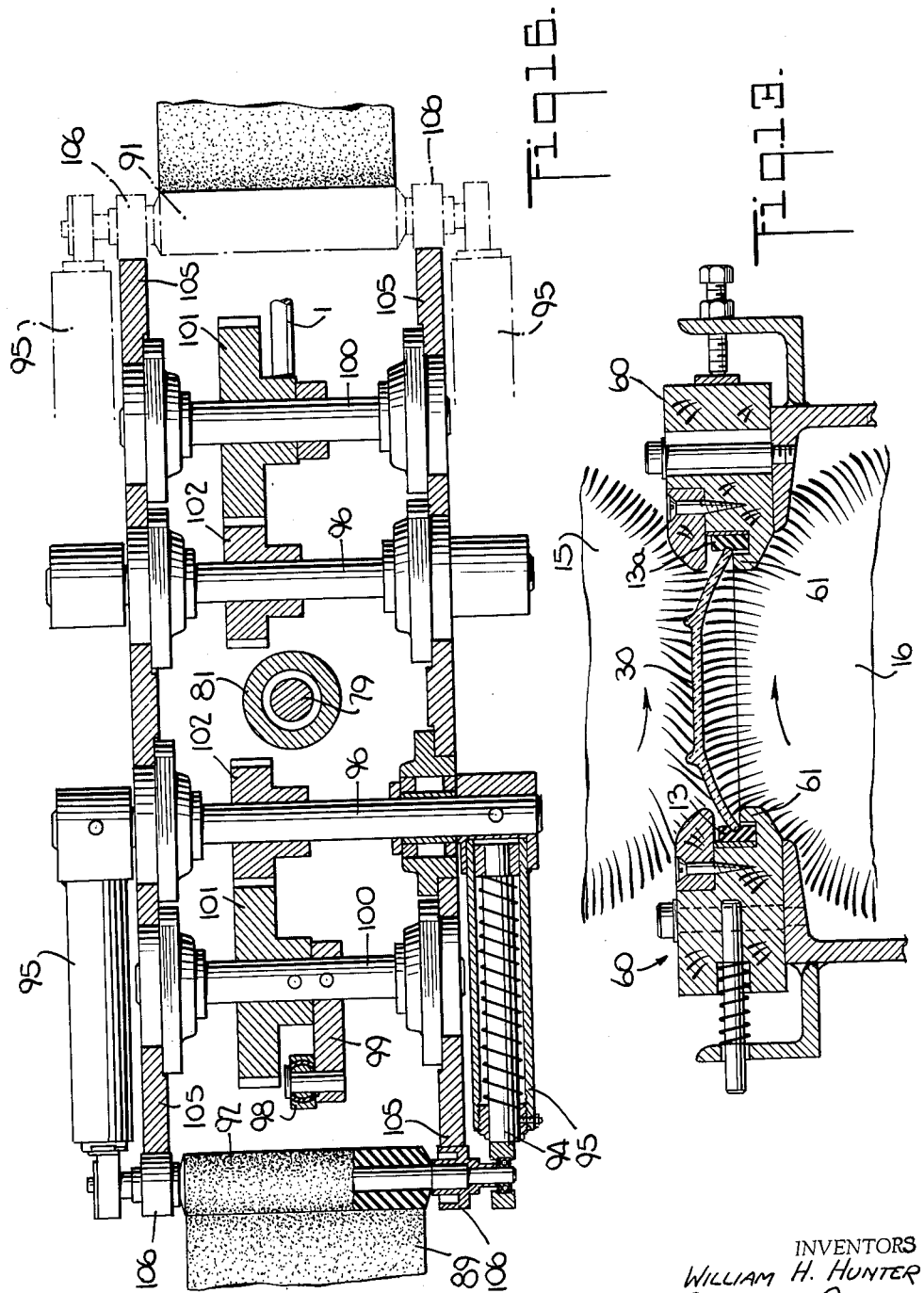

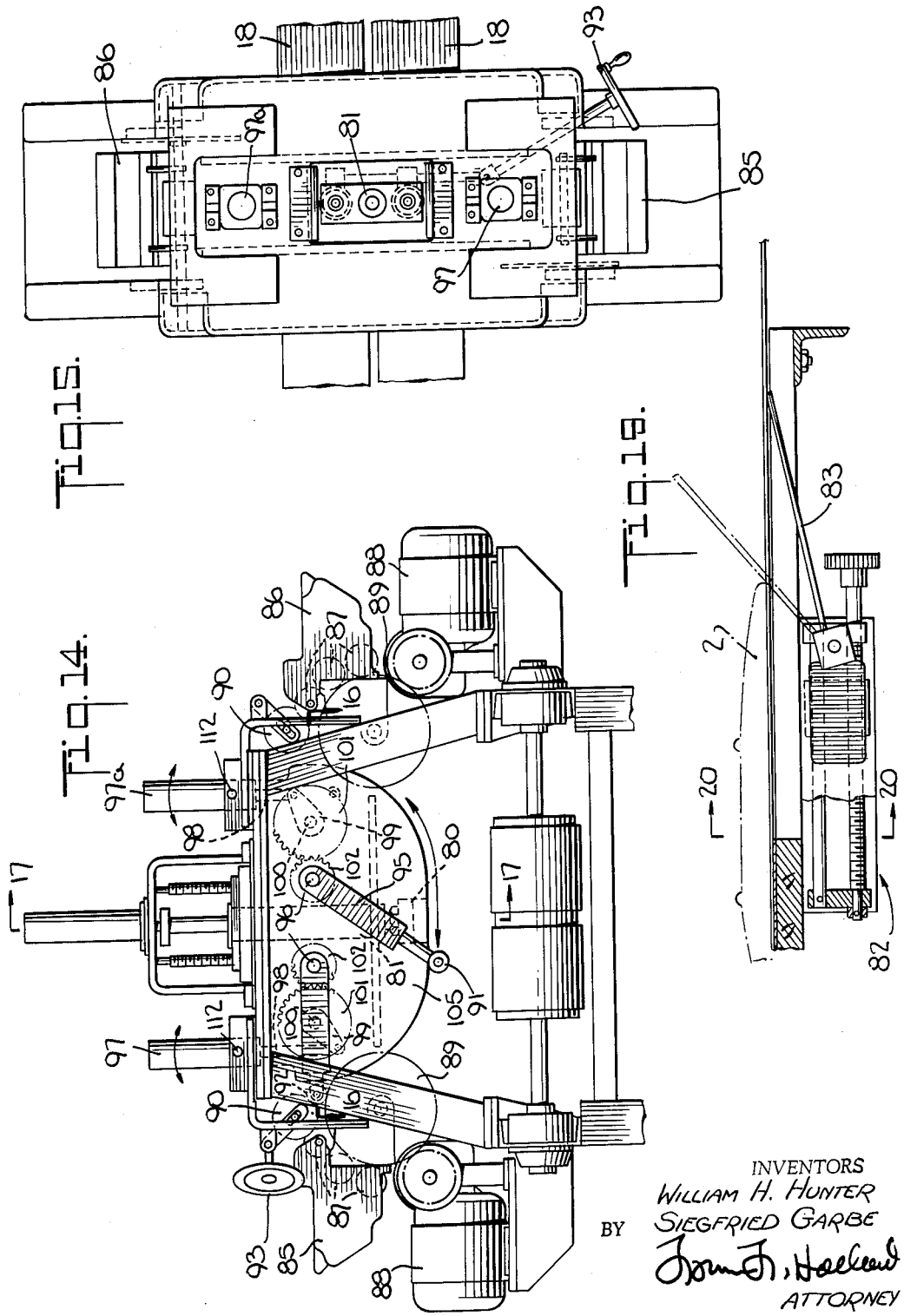

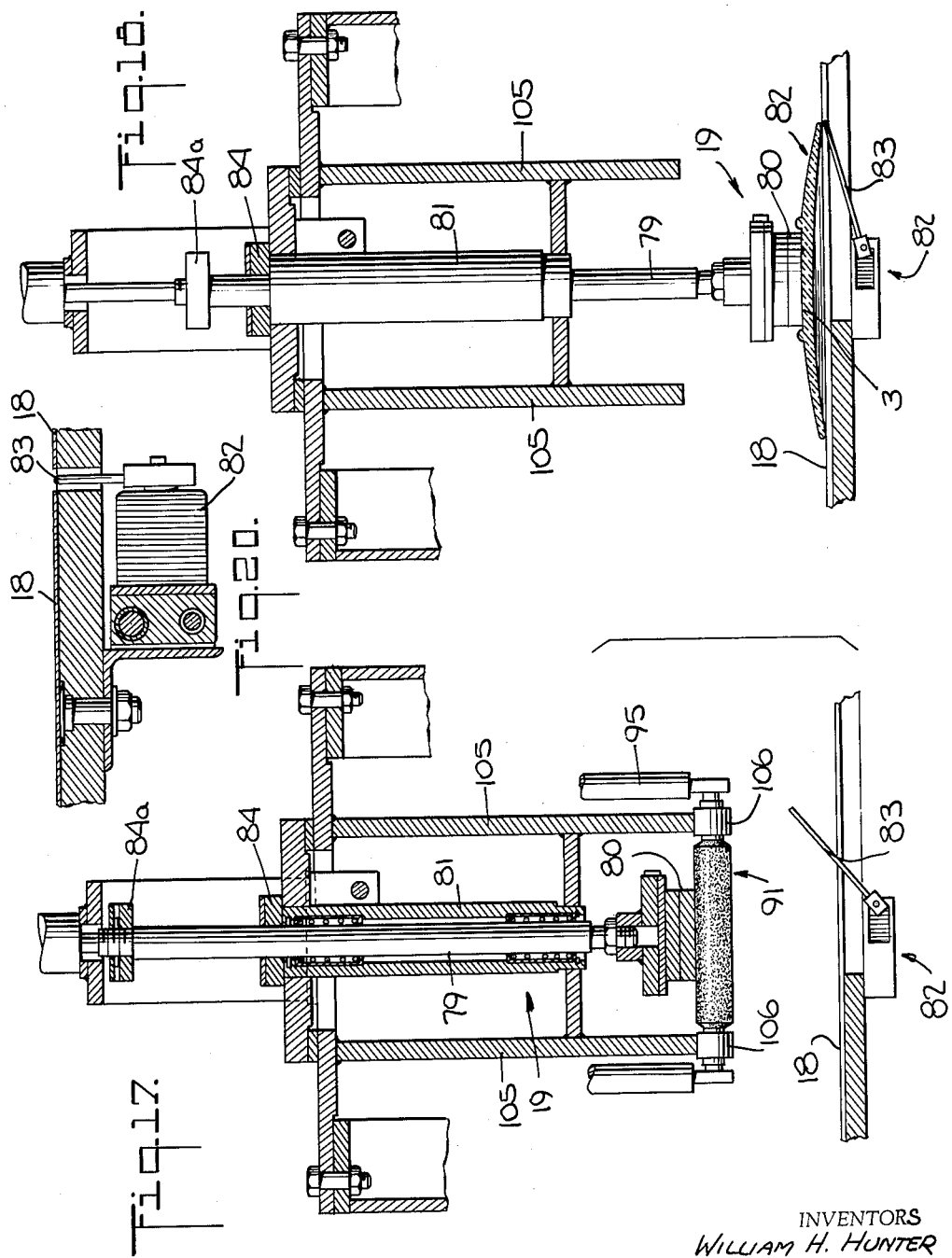

United States Patent Office 3,261,286
Patented July 19, 1966

3,261,286
ARTICLE HANDLING MACHINE
William H. Hunter, Sebring, and Siegfried Garbe, Massillon, Ohio, assignors to Royal China, Inc., Sebring, Ohio, a corporation of Ohio
Filed Apr. 21, 1964, Ser. No. 361,474
6 Claims. (Cl. 101—321)

The present invention relates to an improved article handling machine and more particularly to an improved machine which will feed, brush and back-stamp an article, such as tableware, continuously and without interruption.

In the manufacture of tableware, such as flat dishes, plates and the like, it is desirable to brush both sides of each piece and to thereafter apply a back-stamp, comprising the manufacturer's trademark and other information, to the reverse side of each piece.

Heretofore, these operations have been performed on separate machines or on machines in which the necessary speed required for modern production schedules has not been realized.

The present invention has for one of its objects the provision of an improved machine for feeding, brushing and stamping tableware.

Another object of the present invention is the provision of an improved feeding, brushing and stamping machine which will operate continuously and at higher speeds than present machines.

Another object of the present invention is the provision of an improved feeding, brushing and stamping machine which is completely automatic.

Another object of the present invention is the provision of an improved mechanism for removing each article from a stack and feeding it in one-by-one relationship to other mechanisms in the machine.

Another object of the present invention is the provision of an improved mechanism for simultaneously brushing both sides of each article without any interruption.

Another object of the present invention is the provision of an improved mechanism wherein the back-stamping operation is increased in order to keep up with the speed of present day production speeds.

Another object of the present invention is the provision of an improved stamping mechanism which utilizes a double inking unit.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a diagrammatic perspective view of a machine made in accordance with the present invention showing the feeding, brushing and back-stamping mechanism;

FIG. 2 is a perspective view of the underside of a dish which is to be handled by the present invention;

FIG. 3 is a top view of the machine shown in FIG. 1;

FIG. 4 is a side elevational view thereof;

FIG. 5 is a sectional view taken along line 5—5 of FIG. 4;

FIG. 6 is a sectional view taken along line 6—6 of FIG. 4;

FIG. 7 is a sectional view taken along line 7—7 of FIG. 4;

FIG. 8 is a top plan view of the feeding mechanism used with the present invention;

FIG. 9 is a sectional view taken along line 9—9 of FIG. 8;

FIG. 10 is a sectional view taken along line 10—10 of FIG. 8;

FIG. 11 is a sectional view of the brushing mechanism taken along line 11—11 of FIG. 3;

FIG. 12 is a sectional view of the brushing mechanism taken along line 12—12 of FIG. 4;

FIG. 13 is a detailed sectional view taken along line 13—13 of FIG. 4;

FIG. 14 is a side elevational view of the back-stamping mechanism of the present invention;

FIG. 15 is a top view of the back-stamping section shown in FIG. 14;

FIG. 16 is a sectional view taken along line 16—16 of FIG. 14;

FIG. 17 is a sectional view taken along line 17—17 of FIG. 14;

FIG. 18 is a sectional view similar to FIG. 17 showing the position of the parts during the stamping operation;

FIG. 19 is a detailed showing of the switch for activating the stamping mechanism;

FIG. 20 is a sectional view taken along line 20—20 of FIG. 19; and

FIG. 21 is a schematic diagram of the hydraulic circuit.

For convenience, the present invention will first be described generally and each section of the machine will then be described in detail under separate headings.

*General description*

Referring to FIGS. 1 to 4, the handling machine 1 of the present invention is adapted to feed, brush and back-stamp an article 2, such as the dish shown in FIG. 2. Each dish 2 comprises a raised rear support 3, an outer rim 4 and a front face 5.

The machine 1 comprises a frame F which has a feeding section A adapted to feed the articles 2 one-by-one, a brushing section B adapted to brush both sides of the article and a back-stamping section C adapted to apply a back-stamp to the rear support 3.

The articles 2 are stacked in inverted position one on top of the other at the feeding section A. The articles are stacked on top of spaced rotatable feed disc assemblies 10 between adjacent U-shaped guide rods 11 which keep the articles 2 in vertical alignment. When the feed disc assemblies 10 are rotated, a single article 2, i.e. lowermost one, will drop onto a pair of moving feed conveyor belts 12 which will move the article to the brushing section B.

At the brushing section B the article is transferred to a pair of movable edge gripping brushing belts 13 and 13a which grip the edge or rim 4 of the article 2 and move it between a pair of longitudinally positioned brushes 15 and 16 which are adapted to simultaneously brush both sides of the article while it is being moved through the brushing section B.

After the brushing operation, the article is transferred to the stamping section C by an inclined slide 17. The stamping section C comprises a pair of moving stamping conveyors 18 which bring the article beneath a stamping head assembly 19. At this point a switch assembly 20 is actuated to stop the stamping conveyor 18 and lower the stamping head to apply a back-stamp to the article. After the stamping head assembly 19 is raised, the stamping conveyor 18 is set in motion to remove the article from the machine and transfer it to other suitable mechanisms (not shown) which will perform further operations on it.

*Feeding section*

Details of the feeding section A of the present invention are shown in FIGS. 5 through 10 and comprise a pair of feed belts 12 continuously driven by motor 20a through the intermediation of wheels 21, sprocket 22, chain 23, sprocket 24, shaft 25, sprocket 27 and chain 28. The feed belts 12 underlie the stack of articles and are adapted to receive articles one-by-one. The feed belts 12 are mounted on shaft 29 which is journaled in standards 30 movable relative to each other by screw 31 through hand wheel 32. Thus, the feed belts 12 may be moved toward or away from each other to receive articles of different sizes.

The articles are stacked on a pair of opposed feed disc assemblies 10 whch comprise a pair of spaced shafts 45 having vertically spaced feed discs 46 and 47. The shafts 45 are rotated by motor 20 through gears 49 and 50 so that the feed discs 46 and 47 are rotated continuously. Each lower disc 47 is fixed on its shaft 45 and has an extending article-supporting portion 47a and a rear cutaway portion 47b opposite extending article-supporting portion 47a. The upper disc 46 is spaced from lower disc 47 by a resilient spacer 49 and although rotatable with shaft 45, it is vertically movable relative thereto and held in place by spring 48. Upper disc 46 also is provided with extending article-supporting portion 46a and rear cutaway portion 46b. The upper disc 46 is also provided with a ramp 50 which facilitates transfer of the articles from disc 46 to disc 47. The article-supporting portion 46a and 47a of disks 46 and 47 protrude in direction opposite to eachother so that with each revolution of shafts 45 the supporting portions 46a and 47a are alternately moved into and out of operative position.

All the articles 2 are stacked on article-supporting portions 46a of upper disc 46 which are positioned inwardly in the vertical path of the articles. When the shafts 45 are rotated, the inwardly extending article-supporting portions 46a will be moved from beneath the stack so that the lowermost article will be released. However, the article-supporting portion 47a of the lower disc 47 is simultaneously moved into the path of the stack so that the released article is supported thereby. As the shafts 45 continue to rotate the article-supporting portions 47a of the lower disc 47 are moved out of the way so that the lowermost article drops onto the feed belts 12. However, the supporting portions 46a of the upper discs 46 are now in position beneath the stack of articles so that the stack is held in supported position.

It will thus be seen that the continuous rotation of the shafts 45 and discs 46 and 47 will feed the articles continuously in one-by-one relationship.

In order to maintain the alignment of the articles in a stack, U-shaped guide rods 11 are mounted around the stack. One leg 55 of each U-shaped guide rod 11 is rotatably mounted in the frame F and the free leg 56 is adapted to bear against the rims of the articles 2 and keep the articles in aligned position. By rotating the guide rods 11 by handle 57, the distance between them may be altered so that articles of different sizes may be stacked. Thus, by moving the standards to the broken line position of FIG. 8, articles of smaller diameter may be handled by the feed mechanism.

*Brushing section*

The brushing section B of the present invention is shown in FIGS. 11 through 13. The articles are transferred from feed belts 12 to brushing belts 13 and 13a which are driven by drive shaft 25 through wheels 35, gears 36 and 37, shafts 38, sprockets 39 and 40, chain 41 and sprockets 26 and 42 on drive shaft 25. It will be noted that wheels 35 and gears 36 and 37 are also mounted on adjustable brackets 30 so that they may be adjusted by hand wheel 32 to accommodate articles of different diameters.

The brushing belt 13a is moving toward the back-stamping section C while the brushing belt 13 is moving in the opposite direction at a lesser speed. This causes the articles to move toward back-stamping section C and to simultaneously rotate several times as it moves through the brushing section B so that a thorough cleaning of each article is insured.

The brushing mechanism comprises a pair of horizontally positioned brushes 15 and 16 between which an article 2 is moved by brushing belts 13 and 13a which grip each article at the rim 4 thereof so that the belts 13 and 13a will not interfere with the brushing operation. Belts 13 and 13a are mounted in adjustable guides 60 which have upwardly extending supporting lips 61 adapted to support the articles as they are being brushed by brushes 15 and 16.

The longitudinal axis of brushes 15 and 16 is parallel to the direction of travel of the articles. Each brush 15 and 16 is mounted within casing 65 and 66, respectively, and is journaled in brackets 67 and 68 movable on standards 72 and controlled by a suitable hand wheel 69 and 70, so that the distance between the brushes may be adjusted in order to permit the brushes to accommodate various article depths and to compensate for bristle wear.

Each brush 15 and 16 is comprised of hollow core 15a and 16a and bristles 15b and 16b. The brushes 15 and 16 are rotated by suitable motors 73 and 74 (FIG. 12). It will be noted that each brush is tapered and that the bristles thereof are in close adjacency with each other throughout the length of the brushes. The wider end of each brush is in contact with the narrower end of the other brush in order to give a uniform brushing operation.

With this structure the article is moved between the brushes 15 and 16 by the conveyor belts 13 and 13a and simultaneously rotated so that both the upper and lower surfaces of the article are brushed simultaneously by the bristles of the brushes.

*Back-stamping section*

From the brushing section B, each article is moved to the back-stamping section C (shown in detail in FIGS. 14 through 21) by means of inclined slide 17 which deposits the article to a pair of spaced stamping belts 18. As pointed out above, a stamp head assembly 19 comprising a stamp 80 depending from piston 79 of hydraulic cylinder 81 is lowered to apply a mark or back-stamp to the rear support 3 of the article 2. A vertically adjustable stop plate 84 is adapted to cooperate with collar 84a on piston 79 to permit the stamping force to be adjusted.

A limit switch assembly 82 comprising a contact arm 83 mounted between conveyors 18 and in the path of the articles, is adapted to be struck by each article to energize solenoids 110 (FIG. 21) which controls a valve 111 adapted to actuate cylinder 81 which will lower the piston 79 and the stamp head 80 and apply a back-stamp to the rear support 3 of the article 2. The actuation of the limit switch stops the conveyors 18 so that the article is stationary during the stamping operation. The conveyors begin moving again when the stamping operation is completed.

The stamping cylinder 81 is mounted between a pair of ink reservoirs 85 and 86 which comprises a series of rollers 87 driven by motor 88 through gearing 89. The ink is transferred to a transfer roller 90 which in turn inks a pair of inking rollers 91 and 92 mounted on each side of stamping cylinder 81. A hand wheel 93 controls the position of the various rollers to permit adjustment of the amount of ink supplied to the rollers 91 and 92.

Each roller 91 and 92 is mounted on a spring pressed arm 94 located within cylinder 95, each of which depends from one end of a rotatably mounted shaft 96. Each shaft 96 is rotated by an air cylinder 97 and 97a which is swingable on pivot 112, through the intermediation of piston 98, arm 99, shaft 100 and gears 101 and 102. Air cylinders 97 and 97a are controlled by valves 113 and 114 operable by solenoids 115 and 116 under the control of limit switch 82. When the air cylinders 97 and 97a are operated the reciprocating motion of piston 98 will rotate the shaft 96 to cause the ink rollers 92 to oscillate. This causes each ink roller 91 and 92 to swing in an arc from a position beneath and in contact with the raised stamp head to apply ink thereto to a position in contact with the inking mechanism to receive ink.

The two ink rollers 91 and 92 are operated alternately with each stroke of the stamp head 80 so that with every stroke of the stamping head, one roller (e.g. roller 91) is in the position to apply ink to the stamp head and the other (e.g. roller 92) is in position in contact with the ink applicator. This permits high speed stamping of the articles. A pair of cam plates 105 having cam surfaces 107 are adapted to cooperate with followers 106 on rollers 91 and 92 to guide them over the proper path.

As each article 2 is stamped, the conveyors are actuated to move the article out of the stamping section.

Operation

The operation of the above mechanism will be obvious from the above description. However, it will be briefly summarized herein for convenience.

A plurality of articles are stacked in feeding section A on feed disc assemblies 10. As the feed disc assemblies are rotated, the lowermost article drops from upper discs 46 to lower discs 47 and thence to feed belts 12.

The feed belts 12 and 12a carry each article to the brushing section B where conveyor belts 13 strike the edge of the articles and move them between rotating tapered brushes 15 and 16 which brush both sides of the article simultaneously. During brushing, the article is rotated because the belts 12 and 12a are moving in opposite directions.

The article is then moved to the stamping section C by means of a slide 17 and conveyor belts 18. At the stamping section each article will trip the arm 83 of switch assembly 82 which energizes a circuit and causes the stamping head 80 and the air cylinders 97 and 97a to become operative. The stamp head is lowered to apply the back-stamp to the rear of the article and with each stroke of the stamping head 80, the air cylinders 97 and 97a operate alternately to cause one of the two ink rollers 91 and 92 to swing in an arc and wipe across the face of the stamping head to apply ink thereto while the other roller is moved to a raised position to receive ink from reservoir 85. When the stamping operation is completed, the conveyors are again moved to remove the stamped article.

It will thus be seen that the present invention provides an improved article handling machine in the form of a combined feeding, brushing and stamping machine which is more compact than previous machines and which will operate continuously at higher speeds. Furthermore, the present invention permits improved feeding of articles in one-by-one relationship and provides an improved brushing operation in which both sides of an article are brushed simultaneously. In addition, the mechanism of the present invention provides an improved stamping means whereby the stamping operation may operate at higher speeds.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. An article marking mechanism comprising a reciprocable head, means actuated by an article for initiating the reciprocation of said marking head, an inking roller mounted on each side of said marking head, each inking roller being alternately movable from a position in contact with the marking head to supply ink thereto to a position in contact with an ink reservoir to receive ink therefrom and means for synchronizing the movement of said two rollers so that when one roller is applying ink to the marking head the other roller is in position in contact with said ink reservoir.

2. An article marking mechanism comprising a reciprocable head, means actuated by an article for initiating the reciprocation of said marking head and moving it from a raised position to a lowered operative position, an inking roller mounted on each side of said marking head, each inking roller being alternately movable from a position in contact with the marking head to supply ink thereto to a position in contact with an ink reservoir to receive ink therefrom, the movement of the marking head and the ink rollers being synchronized so that the head is in a raised position when a roller applies ink thereto and means for synchronizing the movement of said two rollers so that when one roller is applying ink to the marking head the other roller is in position in contact with said ink reservoir.

3. An article marking mechanism comprising a reciprocable head, means actuated by an article for initiating the reciprocation of said marking head and moving it from a raised position to a lowered operative position, an inking roller mounted on each side of said marking head, each inking roller being alternately movable in an arc from a position underlying the marking head to supply ink thereto to a position in contact with an ink reservoir to receive ink therefrom, the movement of the marking head and the ink rollers being synchronized so that the head is in a raised position when a roller applies ink thereto and means for synchronizing the movement of said two rollers so that when one roller is applying ink to the marking head the other roller is in position in contact with said ink reservoir.

4. An article marking mechanism as claimed in claim 3 wherein cams are provided for said rollers and wherein said rollers are provided with cam followers.

5. An article marking mechanism as claimed in claim 4 wherein said rollers are mounted on swingable shafts adapted to move the rollers in an arc.

6. An article marking mechanism as claimed in claim 4 wherein air cylinders are provided to actuate said arms and wherein said air cylinders operate alternately to each other and in synchronism with the marking head.

References Cited by the Examiner

UNITED STATES PATENTS

| | | | |
|---|---|---|---|
| 510,146 | 12/1893 | Sawyer | 101—295 |
| 1,139,406 | 5/1915 | Fagerlund et al. | 15—74 |
| 1,802,631 | 4/1931 | Crosby et al. | 221—290 |
| 2,067,092 | 1/1937 | Maiben | 101—321 |
| 2,152,027 | 3/1939 | Carll | 101—425 |
| 2,271,052 | 1/1942 | Varley et al. | 15—74 |
| 2,603,150 | 7/1952 | Klug | 101—320 X |
| 2,613,594 | 10/1952 | Emerson | 101—44 |
| 2,624,279 | 1/1953 | Putnam | 101—321 |
| 3,003,661 | 10/1961 | McGrath | 221—290 |
| 3,094,921 | 6/1963 | James | 101—44 |
| 3,112,692 | 12/1963 | Cookson | 101—425 X |
| 3,187,666 | 6/1965 | Pedroli | 101—44 |

DAVID KLEIN, *Primary Examiner.*

WILLIAM B. PENN, *Examiner.*

NATHANIEL A. HUMPHRIES, WILLIAM F. McCARTHY, *Assistant Examiners.*